United States Patent Office 2,777,664
Patented Jan. 15, 1957

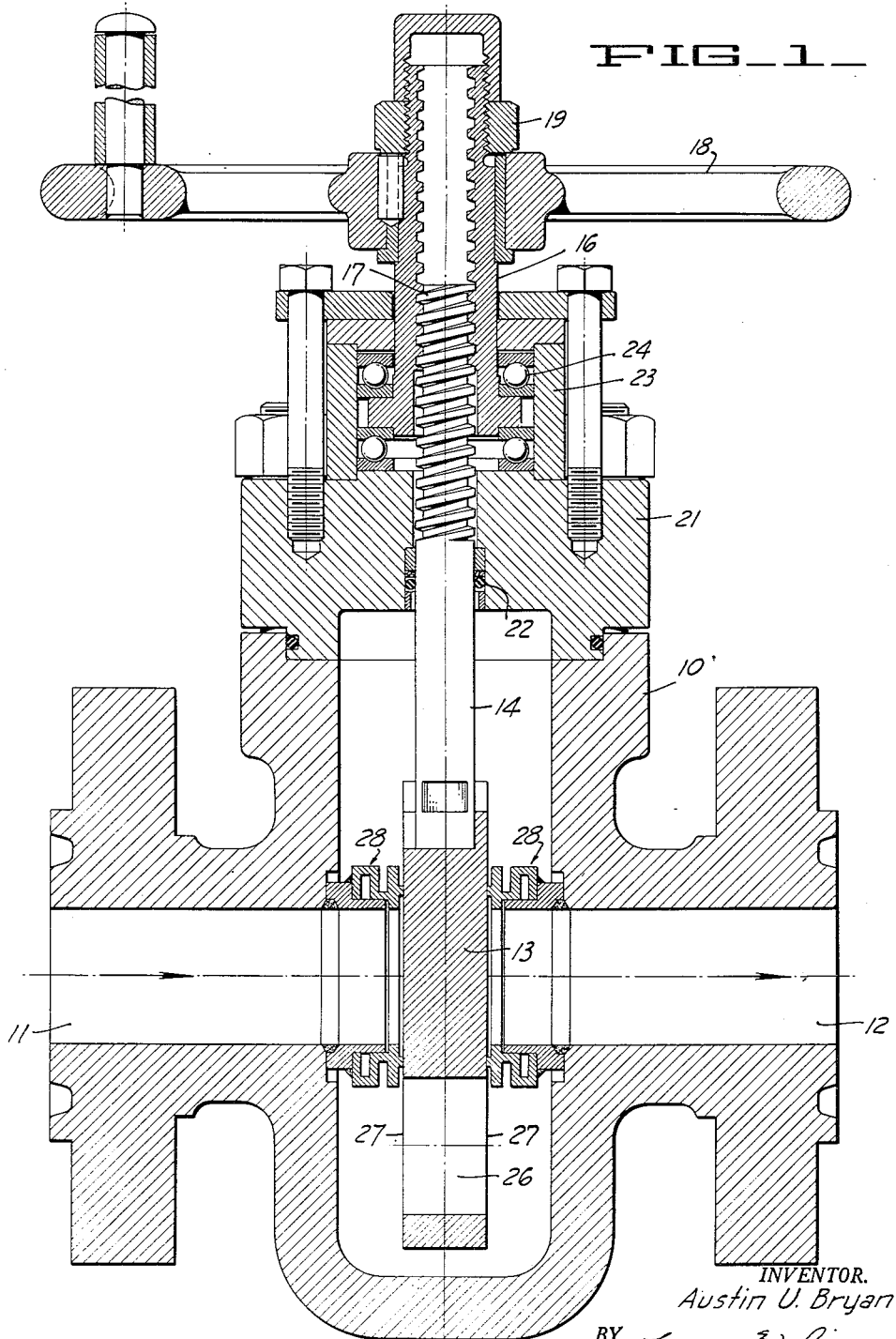
FIG_1_
INVENTOR.
Austin U. Bryant
ATTORNEYS

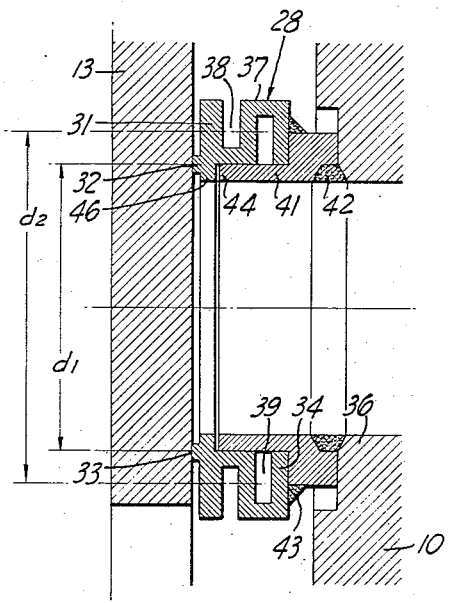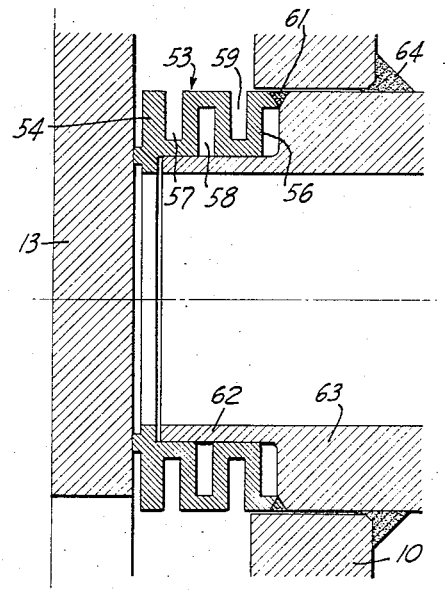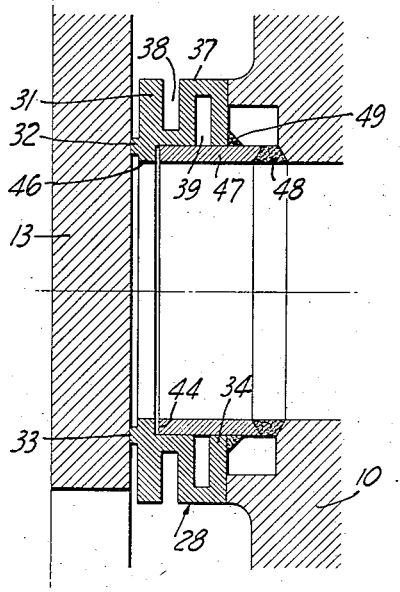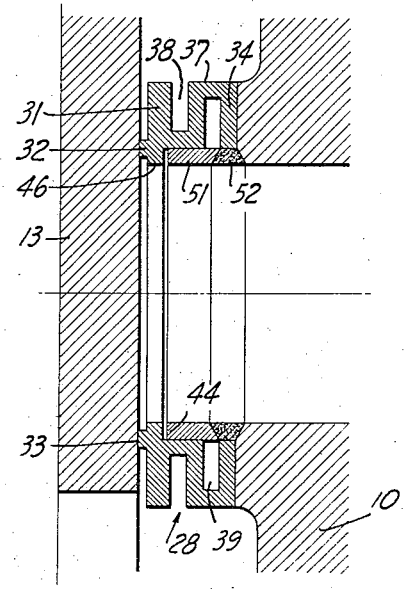

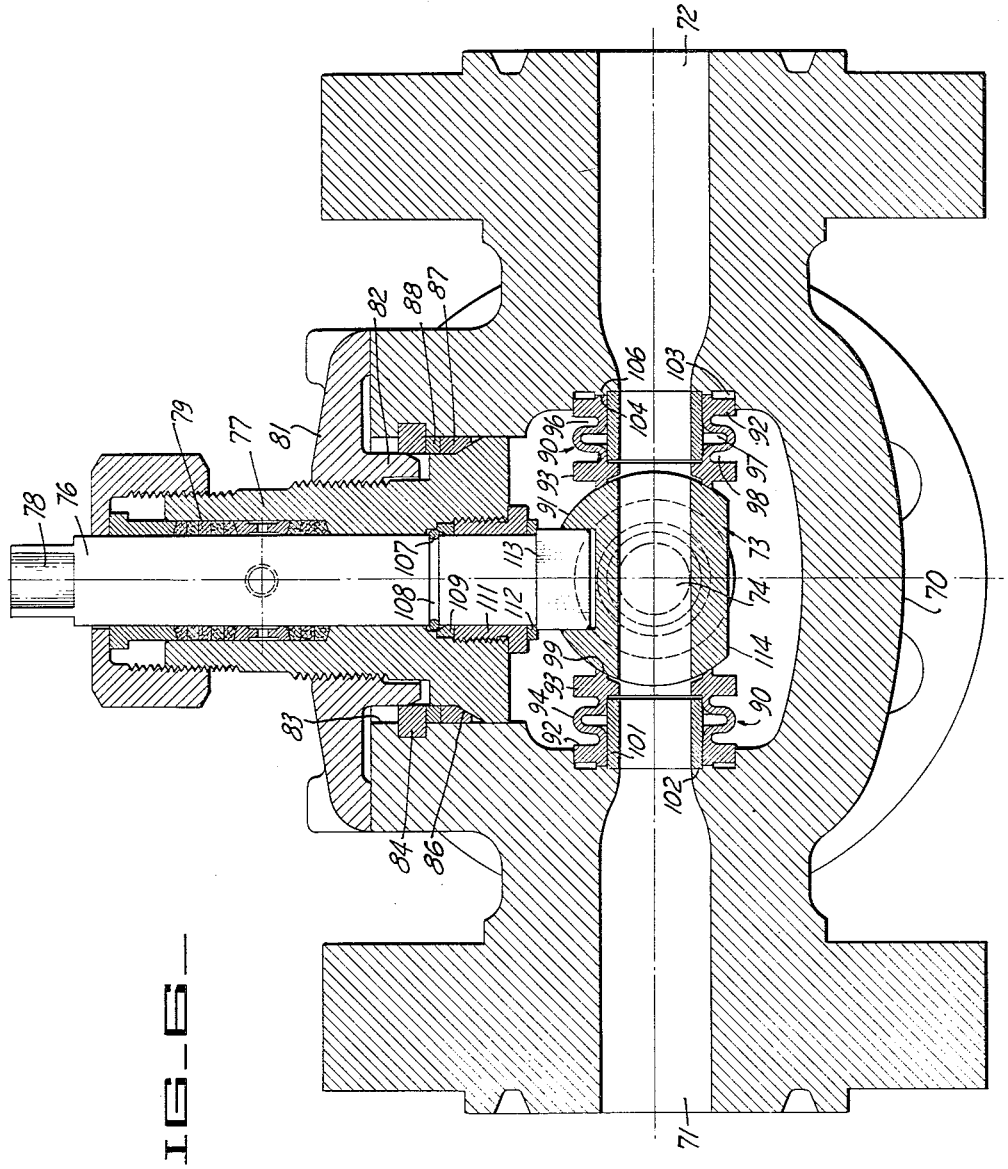

2,777,664

VALVE CONSTRUCTION

Austin U. Bryant, Berkeley, Calif., assignor to Grove Valve and Regulator Company, Emeryville, Calif., a corporation of California Application December 26, 1951, Serial No. 263,155

5 Claims. (Cl. 251—174)

This invention relates generally to valves for controlling fluid flow, having reference to both gases and liquids.

In the manufacture of conventional fluid flow control valves it is necessary to provide valve working surfaces which are in sealing engagement for closed position of the valve. For valves of the rotary plug or sliding gate type, there is relative sliding movement between the valve working surfaces when the valve member is moved between open and closed positions. Particular problems are involved in constructing such valves or for handling relatively high fluid pressures, as, for example, pressures in excess of 500 p. s. i. The use of viscous lubricants or plastic sealing compounds, which is common in so-called lubricated valves of the plug type, aids in maintaining a seal at high fluid pressures, but involves extra and troublesome operative manipulations, and, in addition cannot be used for relatively high temperature service.

In general it is an object of the present invention to provide a novel valve construction which is suitable for relatively high pressure service, and which will facilitate maintenance and proper sealed relation between metal to metal valve working surfaces.

A further object of the invention is to provide a valve of the above character which will be suitable for surfaces where relatively high operating temperatures may be involved.

An additional object of the invention is to provide a valve construction having sealing means between the valve body and the movable valve member which is constructed entirely of metal, and which is acted upon by line pressure to maintain the valve working surfaces in proper sealing relation.

Additional objects and features of the invention will appear from the following description in which the preferred embodiments of the invention have been set forth in detail in conjunction with the accompanying drawing.

Referring to the drawing:

Figure 1 is a side elevational view in section illustrating a valve of the gate type incorporating the present invention.

Figure 2 is an enlarged detail in section illustrating the sealing means incorporated in Figure 1.

Figure 3 is a view like Figure 2 but showing a modification.

Figure 4 is a view like Figure 1 but illustrating another modification.

Figure 5 is a view like Figure 2 and illustrating another modification.

Figure 6 is a side elevational view in section illustrating another embodiment of the invention and in which the valve member is in the form of a rotatable ball.

The valve illustrated in Figure 1 consists generally of a body 10, which has flow passages 11 and 12 for making connection with associated piping. Within the body there is a valve gate 13 which is attached to the operating stem 14.

Various operating devices can be applied to the outer end of stem 14. The hand operated means illustrated consists of an internally threaded sleeve 16 which has threaded engagement with the threaded portion 17 of the stem. A hand wheel 18 is keyed to the sleeve 16, and is retained thereon by the nut 19. The stem extends through the bonnet 21, and is sealed against leakage by means of a conventional packing gland or by the resilient "O" ring 22. This packing gland or sealing means is constructed in accordance with the service for which the valve is to be used. For high temperature service the packing gland should be designed accordingly. Casing 23 is mounted upon the bonnet 21, and serves to house the ball bearing assemblies 24 to form a journal for the lower end of sleeve 16.

With the operating means just described, hand wheel 18 rotates the sleeve 16 and this causes the stem 14 to raise or lower.

The gate 13 is provided with an annular port 26, which, when in open position of the gate, is in alignment with the passages 11 and 12. The side surfaces 27 of the gate are planar and parallel, and form valve working surfaces.

A pair of sealing units 28 are disposed upon opposite sides of the gate and serve to establish sealing relation between the gate and the body. The two units may be identical in construction, and they are formed to provide annular valve working surfaces establishing sealing contact with the valve working surfaces 27. Figure 2 illustrates a suitable construction for one of these units. It consists of a relatively rigid annular portion 31, having an annular rib 32 on its face which provides an annular valve working surface 33. Another annular metal portion 34 has sealing engagement with the adjacent portion 36 of the body. Portion 37 forms a bellows-like means integrally connecting the portions 31 and 34.

The parts of the sealing unit described above can be readily manufactured from one single piece of suitable metal or metal alloy, having spring properties. A solid annular piece of metal, such as can be cut from a length of metal tubing, is machined by turning to provide the slots 38 and 39. These slots are oppositely faced in a radial direction, and they are spaced in the direction of the axis of the unit. In addition, when projected in the direction of the axis of the unit, they overlap radially. The net result is to provide the bellows or diaphragm-like portion 37 which has a substantial amount of give or spring (within the elastic limit of the metal) when the portions 31 and 34 are forced toward or away from each other in an axial direction.

When the sealing units described above are mounted in a valve body, means are provided to prevent displacement in a lateral direction responsive to movements of the valve member. For this purpose a metal retaining sleeve 41 is provided, about which the unit snugly fits, and which, in this instance, is attached to the body portion 36 by the weld connection 42. Portion 34 is secured to the sleeve 41 by weld connection 43. The end portion 44 of the sleeve 41 forms an abutment shoulder in proximity with the annular shoulder 46 formed on portion 31. As in Figure 2 the mean effective diameter of the valve working surface 33 is indicated as being $d1$, and the mean effective diameter of the fluid pressure area presented by the unit 28, to line fluid, is indicated as $d2$. Note that the proportions are such that $d2$ is substantially greater than $d1$. Thus line pressure acts upon the unit to urge portion 31 toward the valve gate.

The gate is provided with suitable guide means (not shown) to generally guide the same for rectilinear movement between open and closed positions. However the guide means should permit limited movement of the gate in a lateral direction to permit the action presently to be described.

With the valve assembly shown in Figure 1, using two sealing units 28, the line fluid for either open or closed positions of the valve gate serves to urge the valve working surfaces together, to maintain the desired sealing relationship. In addition, in assembling the valve the dimensions are such that the sealing units are sprung within their elastic limits, whereby without the effective line pressure, the sealing units are stressed to urge the valve working surfaces into sealing engagement. Assuming that the valve is closed and line pressure is being applied to passage 11 as indicated in Figure 1, the gate is pressed toward the right hand sealing unit and this thrust serves to compress the down stream sealing unit to the extent of bringing the shoulders 44 and 46 into direct abutment. Thereafter the force of the fluid against the gate is applied directly to the retaining sleeve 41, and is not transmitted through the sealing unit. Thus high line pressures do not tend to crush the sealing units or to cause permanent deformation of the same.

For open position of the gate the fluid thrust upon the gate is negligible, but both of the sealing units maintain proper sealing engagement with the gate by virtue of the action of line fluid pressure, and because of the manner in which the units are sprung or stressed.

When the differential presure is reversed, the gate is pressed against the left hand unit, and the right hand unit is urged into sealing contact both by its spring and by application of fluid pressure. Under such conditions the left hand sleeve 41 takes the thrust of the gate.

When the gate is moved between open and closed positions, particularly under pressure, considerable frictional forces are involved tending to displace the sealing units laterally. The retaining sleeves 41 prevent any tendency toward such lateral displacement, and serve to hold the units in relatively accurate alignment.

It will be understood that the valve working surfaces can be subjected to suitable machining, such as machine lapping, in order to insure a proper seal when in intimate contact. Various facing metals or metal alloys can be used, such as stainless steel, and the like. A particular feature of the valve construction provided above is that the valve working surfaces on both sides of the gate are, at all times, in intimate contact. Thus there is no opportunity for grit or foreign material to find its way between the valve working surfaces and there is a shearing action tending to remove accumulations of foreign material from the valve working surfaces as the gate is being moved between open and closed positions.

Because of the "all metal" construction of the sealing units, it will be evident that the valve is suitable for a wide variety of services. It can be used on various liquids or gases which might be injurious to non-metallic materials such as synthetic rubber, etc. Assuming that sealing means for the bonnet and the stem are selected to withstand high temperature operation, the valve can also be used for relatively high temperature service, the only temperature limit being that which might impair the strength and springiness of the metal employed.

In the embodiment of the invention illustrated in Figure 3, the construction of the retaining sleeve has been modified. Thus in this instance a separate cylindrical sleeve 47 is employed and this sleeve has a weld connection 48 with the body. The annular portion 34 of the sealing unit has a weld connection 49 to the retaining sleeve. The arrangement shown in this figure provides a somewhat greater amount of give, due to the fact that portion 34 may flex a certain amount.

In the modification of Figure 4, the sealing unit 28 is the same as in Figure 2, but in this instance the retaining sleeve 51 is somewhat shorter than the sleeve 47 of Figure 3. Sleeve 51 is attached to the body by weld connection 52, and this connection also provides a sealed weld connection with the inner periphery of the portion 34.

Figure 5 illustrates a modified type of sealing unit, and also a modified type of retaining sleeve. In this instance the unit 53 includes the end annular portions 54 and 56, corresponding to portions 31 and 34 of Figure 2. In place of two machined slots 38 and 39, this unit is provided with three slots 57, 58 and 59. The outer periphery of portion 56 has a weld connection 61 to the body. The retaining sleeve 62 is formed integrally upon the inner end of the tube 63. This tube has a weld connection 64 to the body and at its outer end can be threaded or flanged for making connection with associated piping. Note that the inner end of the tube 63 is attached to the body by the same weld connection 61.

Figure 6 shows my invention incorporated in a valve of the type having a rotating valve ball. Thus in this instance there is a valve body 70, which is provided with passages 71 and 72. Within the body there is a valve ball 72 that has a transverse port 74 adapted to be aligned with passages 71 and 72 for open position of the valve. Ball 73 has a loose driving connection with the inner end of the operating stem 76. This stem extends upwardly through the bonnet 77, and at its outer end 78 can be squared or otherwise formed for attachment of a wrench or handle. Suitable means such as a conventional packing gland 79 can be provided for establishing a seal between the stem 76 and the bonnet 77. Suitable means is also provided for holding the bonnet within the body, and for establishing a seal which will withstand relatively high fluid pressures. For this purpose I have shown a clamping plate 81 threaded upon the bonnet, and provided with a depending annular portion 82 which extends into the annular bore 83 of the bonnet. The bore 83 is grooved to accommodate the metal locking ring 84. Inwardly of the ring 84 the bonnet is provided with the bevelled or conical annular surface 86. Interposed between the bevelled surface 86 and the snap-in ring 84, are the seal rings 87 and 88. These seal rings can be formed of suitable metal, and the seal which they provide is made more effective by the action of line pressure upon the bonnet. The dependent annular portion 82 of the clamping plate 81 extends within the ring 84, to hold the latter in place. Ring 84, if desired, can be formed of a plurality of segments, which are held in place in the manner described above.

The "all metal" sealing units 90 are interposed between the valve body on the opposite sides of the ball 73. The ball provides a spherical valve working surface 91 which the sealing units engage. Each sealing unit consists of the end portions 92 and 93, in conjunction with the intermediate and integral bellows-like portion 94. Portion 94 is formed by the several grooves 96, 97 and 98, which are formed by suitable machining operations. Portion 93 is provided with a spherical shaped valve working surface 99, which is adapted to seal upon the spherical valve working surface 91 of the ball. Each sealing unit is mounted upon a retaining sleeve 101, one end of which is seated within a recess 102 provided in the valve body. The valve body is also provided with a cylindrical bore 103 which is dimensioned to snugly receive the metal portion 92. While portion 92 in this instance may have a weld or other permanent type of connection to the body, it is shown provided with a seal to the body formed by the machined rib 104 which has face to face contact with the machined rib 106 on the valve body. The adjacent faces of these portions are suitably finished as by machine lapping, to provide a fluid tight seal when pressed into engagement.

The center of the ball 73 should be aligned with the axis of the two sealing units. Likewise it is desirable that the stem 76 be positioned to permit the proper alignment of the ball, while at the same time holding the ball against undesired displacement. In the construction illustrated means is provided between the stem and the bonnet 77 to take the thrust of line pressure against the stem. This arrangement includes a snap-in ring 107 which is applied to a groove 108 in the stem and which is engaged by the ring 109. The ring 109 is in turn held in place by the threaded fitting 111. The inner end face of the fitting 111 is engaged by a washer 112, which in turn engages the annular shoulder 113 formed on the inner end of the stem.

It is desirable to construct the parts whereby when desired the ball can be removed from the valve body after removing the bonnet 77 and the stem 76. To facilitate removal of the ball its lower end is flattened as indicated at 114. Upon removal of the valve stem and the bonnet, the ball can be turned through 90° to bring the flattened face 114 at right angles to the axis of the passages 71 and 72, and thereafter the ball can be moved through the bore 83.

With the arrangement illustrated in Figure 6, the valve working surfaces of portions 93 are maintained in tight sealing engagement with the spherical surface 91 of the ball. At the same time the surfaces of the ribs 104 and 106 are maintained in tight sealing engagement. The engagement between the surfaces just mentioned is by virtue of the normal compressed condition of the sealing units, and also by virtue of the fact that each sealing unit tends to be expanded by application of line fluid pressure.

Assuming that pressure is applied to passage 71, the coupling between the ball 73 and the lower end of the stem is such that the ball may move toward the right a small amount without being twisted, to bring the portion 93 of the right hand sealing unit 90 into abutting engagement with its associated retaining sleeve 101. Thereafter thrust against the ball is transmitted directly to the body. The sealing unit on the upstream side of the ball is pressed into sealing engagement by virtue of the stressing of the resilient portion 94 and by virtue of the fact that the pressure areas are such that line fluid urges the valve working surfaces into sealing engagement. When the valve ball is in open position as illustrated in Figure 6, line pressure does not tend to urge it laterally but both of the sealing units maintain their valve working surfaces in sealing engagement, both by virtue of the stressing of the resilient portions 94, and by virtue of the effect of line pressure.

When it is desired to service or repair the valves shown in Figure 6, the bonnet 77 is moved together with the stem 76. The valve ball 73 is then turned 90° from the position shown in Figure 6, to bring the flat surface 114 in parallel position to the end of one of the sealing units. Thereafter the ball can be removed through the opening normally accommodated by the bonnet.

Although in the embodiment of Figure 6 the sealing units are being pressed by line pressure into sealing engagement with the body, it will be evident that the units can be attached to the body by welding, as described in the previous embodiments.

The valve of Figure 6 can be made to provide more than two body passages. Thus as indicated in dotted lines two additional passages can be provided at right angles to passages 71 and 72, and the body equipped with a second pair of sealing units for cooperating with such passages. When the valve member is turned 90° from the open position shown in Figure 6, the port 74 communicates between the two additional passages. Similar multiport valves can be made with more than one port in the valve ball, to route the fluid flow as desired.

I claim:

1. In a valve construction, a body having fluid flow passages, a valve member within the body and movable between open and closed positions, said member having a valve working surface, and means carried by the body forming a valve working surface adapted to cooperate with and seal with respect to the valve working surface of the valve member, said last named means comprising an annular metal sealing unit, the unit having one rigid annular portion sealed with respect to the body and another rigid annular portion forming an annular valve working surface and sealed with respect to the valve working surface of the valve member, said portions being integrally joined by a bellows-like resilient metal portion which is normally stressed within its elastic limit whereby said valve working surfaces are urged together into sealing engagement, said valve working surfaces being in direct rubbing contact when the valve member is moved, and a rigid sleeve carried by the body and serving to limit compression of said bellows-like portion, said sleeve closely interfitting said bellows-like portion and serving to directly transmit thrust from said other rigid annular portion to the valve body, whereby the thrust caused by fluid pressure applied to the valve member in closed position of the same is carried by said sleeve.

2. A valve as in claim 1 in which the movable valve member is in the form of a sliding gate.

3. A valve as in claim 1 in which said movable valve member is in the form of a rotatable member.

4. A valve as in claim 1 in which there are two of said metal annular sealing units in axial alignment and engaging opposite sides of said valve member, and in which the valve member is free for limited movement along the axis of said units.

5. In a valve construction, a body having fluid flow passages, a valve member within the body and movable between open and closed positions, said valve member having a valve working surface, and means carried by the body forming a valve working surface adapted to cooperate with and seal with respect to the valve working surface of the valve member, said last named means comprising an annular metal sealing unit, the unit having one rigid annular portion sealed with respect to the body and another rigid annular portion forming an annular valve working surface that is in direct contact with the valve working surface of the valve member, said portions being integrally joined by a bellow-like resilient metal portion that is normally stressed within its elastic limit whereby said valve working surfaces are urged together into sealing engagement, said unit as viewed in section being contoured to provide at least two annular slots which are oppositely faced in a radial direction and spaced in the direction of the axis of the unit, the slots being overlapped radially as viewed in the direction of the axis of the unit, a rigid metal sleeve having one end of the same fixed to the body and extending into sliding interfitting relationship with said unit, the free end of said sleeve being in close proximity with said other rigid annular portion and serving to directly transmit thrust from said other rigid annular portion to the valve body, whereby the thrust caused by fluid pressure applied to the valve member in closed position of the same is carried substantially entirely by said sleeve, said sleeve also serving as means to prevent displacement of said other annular portion in a direction laterally of the axis of the unit.

References Cited in the file of this patent

UNITED STATES PATENTS

| | | |
|---|---|---|
| 1,489,857 | Stevens | Apr. 8, 1924 |
| 1,736,261 | Hallett | Nov. 19, 1929 |
| 2,471,941 | Downey | May 31, 1949 |
| 2,573,177 | Bohlen | Oct. 30, 1951 |

FOREIGN PATENTS

| | | |
|---|---|---|
| 629,628 | Germany | July 19, 1934 |
| 802,047 | France | of 1936 |